US012779425B2

(12) United States Patent
Kim et al.

(10) Patent No.: US 12,779,425 B2
(45) Date of Patent: Nov. 3, 2026

(54) POLYMERIZATION REACTOR FOR PRODUCTION OF SUPER ABSORBENT POLYMER

(71) Applicant: LG Chem, Ltd., Seoul (KR)

(72) Inventors: Jung Eun Kim, Daejeon (KR); Seungmo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 811 days.

(21) Appl. No.: 17/797,344

(22) PCT Filed: Oct. 5, 2021

(86) PCT No.: PCT/KR2021/013601
§ 371 (c)(1),
(2) Date: Aug. 3, 2022

(87) PCT Pub. No.: WO2022/085993
PCT Pub. Date: Apr. 28, 2022

(65) Prior Publication Data
US 2023/0055607 A1 Feb. 23, 2023

(30) Foreign Application Priority Data
Oct. 23, 2020 (KR) ........................ 10-2020-0138509

(51) Int. Cl.
*B01J 19/12* (2006.01)
*B01J 19/06* (2006.01)

(52) U.S. Cl.
CPC ............. *B01J 19/122* (2013.01); *B01J 19/06* (2013.01); *B01J 2219/0869* (2013.01); *B01J 2219/0877* (2013.01); *B01J 2219/1203* (2013.01)

(58) Field of Classification Search
CPC ................................ B01J 19/122; B01J 19/06
See application file for complete search history.

(56) References Cited

U.S. PATENT DOCUMENTS 4,446,261 A 5/1984 Yamasaki et al.
10,640,591 B2 5/2020 Imura et al.
(Continued)

FOREIGN PATENT DOCUMENTS

EP 1589040 A1 10/2005
EP 4043497 A1 8/2022
(Continued)

OTHER PUBLICATIONS

JP-2017141675-A Machine translation (Year: 2017).*
(Continued)

*Primary Examiner* — Claire X Wang
*Assistant Examiner* — Alyssa Lee Kuykendall
(74) *Attorney, Agent, or Firm* — Lerner David LLP

(57) ABSTRACT

A polymerization reactor for production of a super absorbent polymer including: a composition supply part for supplying a monomer composition solution; a central pipe connected to the composition supply part; a composition distribution part including a first connecting pipe that is obliquely connected to the central pipe at a first angle with respect to the central pipe; a pair of first branch pipes that are obliquely branched at a second angle with respect to the first connecting pipe; a conveyor belt located under the discharge port of the first branch pipe and on which the composition solution is deposited; and an energy supply part for supplying polymerization energy to the composition solution on the conveyor belt, wherein the first angle is an angle between the conveyor belt and the connecting pipe, and the second angle is an angle between the connecting pipe and each branch pipe.

11 Claims, 2 Drawing Sheets

(56) References Cited

U.S. PATENT DOCUMENTS

| | | | |
|---|---|---|---|
| 10,967,347 | B2 | 4/2021 | Kim et al. |
| 2011/0313113 | A1 | 12/2011 | Sakamoto et al. |
| 2012/0258851 | A1 | 10/2012 | Nakatsuru et al. |
| 2013/0026412 | A1 | 1/2013 | Machida et al. |
| 2013/0101851 | A1 | 4/2013 | Takaai et al. |
| 2014/0296465 | A1 | 10/2014 | Sakamoto et al. |
| 2015/0080539 | A1 | 3/2015 | Maeda et al. |
| 2015/0259494 | A1 | 9/2015 | Takaai et al. |
| 2016/0332141 | A1 | 11/2016 | Machida et al. |
| 2017/0226968 | A1 | 8/2017 | Nakamura et al. |
| 2017/0282146 | A1 | 10/2017 | Maeda et al. |
| 2017/0296999 | A1 | 10/2017 | Choi et al. |
| 2021/0001295 | A1 | 1/2021 | Kim et al. |
| 2022/0403058 | A1 | 12/2022 | Kim et al. |

FOREIGN PATENT DOCUMENTS

| | | | | | |
|---|---|---|---|---|---|
| JP | S56161408 | A | | 12/1981 | |
| JP | S57158209 | A | | 9/1982 | |
| JP | S57198714 | A | | 12/1982 | |
| JP | 2002308916 | A | | 10/2002 | |
| JP | 2003287200 | A | | 10/2003 | |
| JP | 2006160846 | A | | 6/2006 | |
| JP | 4312316 | B2 | | 8/2009 | |
| JP | 2017141675 | A | * | 8/2017 | ............. F02M 26/20 |
| JP | 2017192568 | A | | 10/2017 | |
| JP | 6685926 | B2 | | 4/2020 | |
| KR | 20120132475 | A | | 12/2012 | |
| KR | 20130112265 | A | | 10/2013 | |
| KR | 20140140034 | A | | 12/2014 | |
| KR | 20150019319 | A | | 2/2015 | |
| KR | 20150067998 | A | | 6/2015 | |
| KR | 20150068302 | A | * | 11/2015 | |
| KR | 20150133142 | A | | 11/2015 | |
| KR | 101648138 | B1 | | 8/2016 | |
| KR | 20170023437 | A | | 3/2017 | |
| KR | 20220054051 | A | | 5/2022 | |
| WO | 2011162544 | A2 | | 12/2011 | |
| WO | 2019074328 | A2 | | 4/2019 | |

OTHER PUBLICATIONS

KR-20150133142-A Machine translation (Year: 2015).*

Extended European Search Report including Written Opinion for Application No. 21883065.1 dated Aug. 4, 2023, pp. 1-7.

Buchholz, F. et al., "Modern Superabsorbent Polymer Technology" Nov. 1997, Wiley-Vch, John Wiley & Sons, Inc, pp. 1-26.

Third Party Observation for App No. PCT/KR2021/013601, dated Feb. 12, 2023, pp. 1-6.

International Search Report for Application No. PCT/KR2021/013601 mailed Jan. 13, 2022, pp. 1-4.

Odian, G. "Principles of Polymerization" Dec. 1981, p. 203, John Wiley & Sons, Inc.

Schwalm, R. "UV Coatings: Basics, Recent Developments and New Applications," Dec. 2006, p. 115, Elsevier.

* cited by examiner

【FIG. 1】
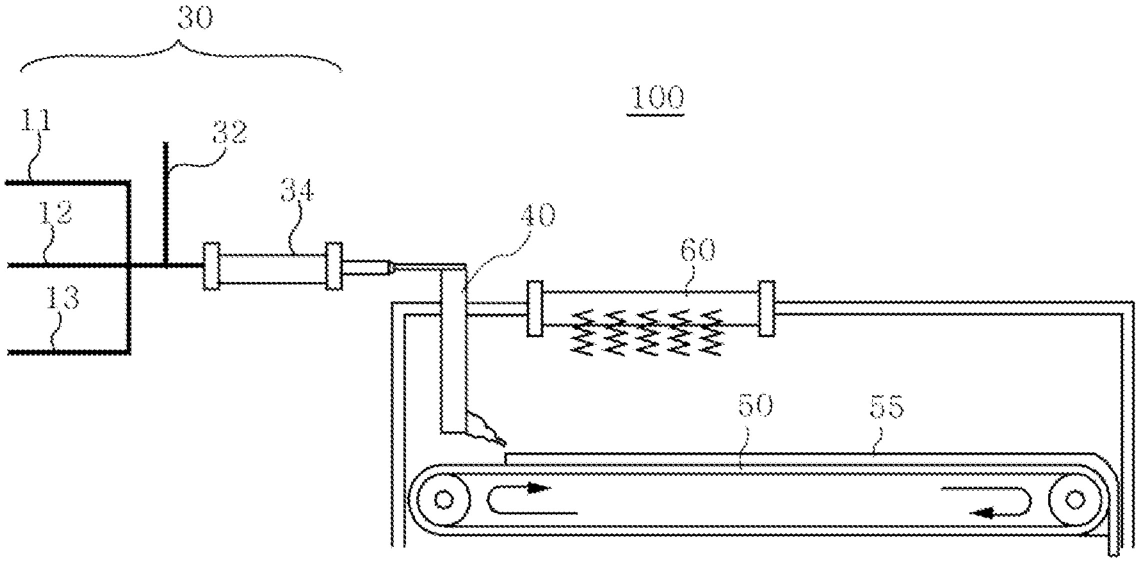
【FIG. 2】
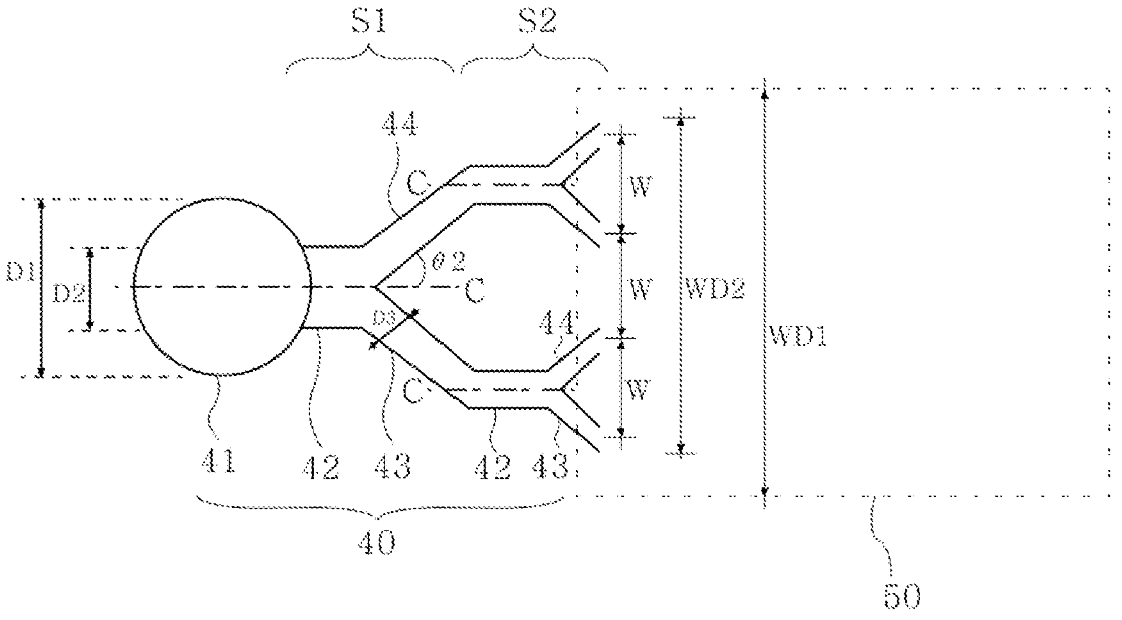

【FIG. 3】
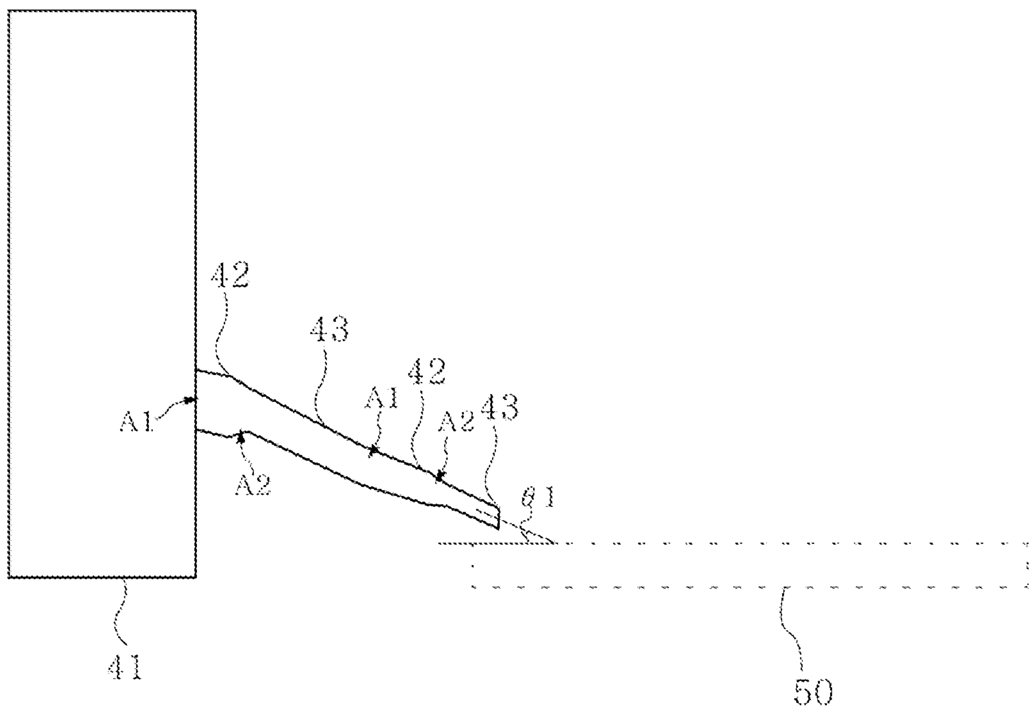

POLYMERIZATION REACTOR FOR PRODUCTION OF SUPER ABSORBENT POLYMER

CROSS-REFERENCE TO RELATED APPLICATION(S)

The present application is a national phase entry under 35 U.S.C. § 371 of International Application No. PCT/KR2021/013601, filed on Oct. 5, 2021, which claims priority to Korean Patent Application No. 10-2020-0138509, filed on Oct. 23, 2020 the disclosures of which are incorporated herein by reference in their entirety.

TECHNICAL FIELD

The present disclosure relates to a polymerization reactor for the production of a super absorbent polymer.

BACKGROUND OF ART

A super absorbent polymer (SAP) is a type of synthetic polymeric material capable of absorbing moisture from about 500 to 1000 times its own weight. Various manufacturers have denominated it by different names, such as a SAM (Super Absorbency Material), an AGM (Absorbent Gel Material), etc. Since such super absorbent polymers started to be practically applied in sanitary products, now they are widely used not only for hygiene products such as disposable diapers for children, etc., but also for water retaining soil products for gardening, water stop materials for civil engineering and construction, sheets for raising seedlings, fresh-keeping agents for food distribution fields, materials for poultices, and the like.

As a production process for such super absorbent polymers, a process by reverse phase suspension polymerization and a process by an aqueous solution polymerization have been known. The reverse phase suspension polymerization method is disclosed, for example, in Japanese Unexamined Patent Publication Nos. 56-161408 (JPS56161408A; 1981.12.11), 57-158209 (JPS57158209A; 1982.09.30), 57-198714 (JPS57198714A; 1982.12.06), and the like.

The process by the aqueous solution polymerization further includes a thermal polymerization method in which a hydrogel-like polymer is polymerized while being broken and cooled in a kneader equipped with a plurality of shafts, and a photo-polymerization method in which an aqueous solution with a high concentration is irradiated with UV rays onto a belt to perform polymerization and drying at the same time.

Such super absorbent polymers can be generally produced into powdered products by polymerizing monomers for polymer production, and drying and pulverizing them, and the step of polymerizing the monomers is an important step in determining the physical properties of the polymer.

Among them, in the production method using the photopolymerization, a monomer composition for a resin is placed on a moving belt and irradiated with light from the upper part while moving, thereby inducing polymerization of the monomer composition in a continuous process.

The injection of the monomer composition is performed through a dispenser. Generally, the composition discharged from one pipe is discharged through a plurality of discharge ports.

At this time, the composition instantaneously spreads due to the injection pressure injected into the pipe, and the composition is biased and sprayed onto discharge ports located at both ends of the plurality of discharge ports.

Due to such a phenomenon, a difference in composition flow rate occurs between the discharge port adjacent to the pipe and the discharge port located at the end, and a clogging phenomenon occurs at certain discharge ports. In addition, the amount of the composition deposited onto the belt is different so that the resin sheet to be produced is produced non-uniformly.

DETAILED DESCRIPTION OF THE INVENTION

Technical Problem

It is an object of the present disclosure to provide a polymerization reactor for the production of a super absorbent polymer that can supply a composition onto a belt in a uniform amount while rapidly supplying the composition onto the belt via a plurality of discharge ports.

Technical Solution

A polymerization reactor for production of a super absorbent polymer according to the present disclosure includes:

- a composition supply part for supplying a monomer composition solution;
- a central pipe connected to the composition supply part;
- a composition distribution part including a first connecting pipe that is obliquely connected to the central pipe at a first angle with respect to the central pipe, and a pair of first branch pipes that are obliquely branched at a second angle with respect to the first connecting pipe;
- a conveyor belt located under a discharge port of the first branch pipe and on which the composition solution is deposited; and
- an energy supply part for supplying polymerization energy to the composition solution on the conveyor belt,
- wherein the first angle is an angle between the conveyor belt and the connecting pipe, and
- the second angle is an angle between the connecting pipe and each branch pipe.

The first branch pipe may be inclined with respect to the central pipe at a first angle.

A diameter of a first connection pipe injection port relatively adjacent to the central pipe may be larger than a diameter of a first connection pipe discharge port relatively adjacent to the first branch pipe.

The first branch pipes are symmetrical with each other with respect to the first connecting pipe.

The composition supply part may further include a raw material supply part, a solvent supply part, and a monomer composition mixing part.

The energy supply part may supply light energy.

The composition distribution part may further include a second connecting pipe connected to the first branch pipe, and a pair of second branch pipes branched from the second connecting pipe.

Also, a polymerization reactor for production of a super absorbent polymer according to the present disclosure includes:

- a composition supply part for supplying a monomer composition solution;
- a central pipe connected to the composition supply part;

a composition distribution part connected to the central pipe and including a pipe connected in a plurality of stages;

a conveyor belt on which the composition solution is deposited from the composition distribution part; and an energy supply part for supplying energy for polymerization to the composition solution on the conveyor belt, wherein each of the stages includes a connecting pipe and a pair of branch pipes branched to both sides based on the connecting pipe.

The connecting pipe is configured such that a diameter of an injection port through which the composition solution is injected is larger than a diameter of a discharge port through which the composition solution is discharged.

The first stage of the composition distribution part includes a first connecting pipe connected to the central pipe, and a pair of first branch pipes branched from the first connection pipe, and a subsequent stage connected to the first stage includes a second connecting pipe connected to the branch pipe of the first stage, and a pair of second branch pipes branched from the second connecting pipe.

A diameter of the connecting pipe and a diameter of the branch pipe contained in the front end positioned relatively adjacent to the center pipe may be larger than a diameter of the connecting pipe and a diameter of the branch pipe contained in the rear end positioned relatively far from the central pipe.

The connecting pipe and the branch pipe may be connected symmetrically with respect to the central pipe.

Advantageous Effects

When the super absorbent polymer is produced using the polymerization reactor of the present disclosure, the composition is uniformly injected to ensure the uniformity of the polymerization reaction, making it possible to ensure the quality of the super absorbent polymer and to increase productivity.

BRIEF DESCRIPTION OF THE DRAWINGS

FIG. 1 is a diagram schematically showing a polymerization reactor for the production of a super absorbent polymer according to one embodiment of the present disclosure.

FIGS. 2 and 3 are diagrams schematically showing a composition distribution part of a polymerization reactor according to one embodiment of the present disclosure.

<Description of Reference Numerals>

| | |
|---|---|
| 11,12,13: raw material supply part | 32: solvent supply part |
| 34: composition mixing part | 40: composition distribution part |
| 50: conveyor belt | 60: polymerization energy supply part |
| 55: monomer composition | 100: polymerization reactor |

DETAILED DESCRIPTION OF THE EMBODIMENTS

Hereinafter, embodiments of the present disclosure will be described in detail with reference to the accompanying drawings so that those skilled in the art can easily implement them. The embodiments of the present disclosure can be modified in various different ways, and are not limited to the embodiments set forth herein.

Now, embodiments of the present disclosure will be described in detail with reference to the accompanying drawings.

FIG. 1 is a diagram schematically showing a polymerization reactor for the production of a super absorbent polymer according to one embodiment of the present disclosure.

As shown in FIG. 1, a polymerization reactor 100 according to one embodiment of the present disclosure includes a composition supply part 30 for supplying raw materials for polymerization, a composition distribution part 40, a conveyor belt 50, and an energy supply part 60.

The composition supply part 30 includes a plurality of raw material supply parts 11, 12, and 13 for supplying raw materials of the super absorbent polymer, a solvent supply part 32 for supplying a solvent, and a monomer composition mixing part 34 for mixing the raw material and the solvent.

The raw materials of the super absorbent polymer may be, for example, a monomer, a basic compound for neutralizing the monomer, a photo-polymerization initiator, a crosslinking agent, and various additives, and the solvent is not limited as long as it is a liquid capable of dissolving the raw materials. Although only three raw material supply parts 11, 12, and 13 are shown in the drawings, the present disclosure is not limited thereto, and it can be modified in a different way depending on the number of raw materials. Further, the solvent can be separately supplied through the solvent supply part 32.

The raw materials of the super absorbent polymer and a solvent are uniformly mixed in the monomer composition mixing part 34 to prepare a monomer composition solution, which is then discharged onto the conveyor belt 50 through the composition distribution part 40.

The composition distribution part 40 uniformly discharges the monomer composition mixed in the monomer composition mixing part 34 onto the conveyor belt 50.

The composition mixed from the monomer composition mixing part 34 is supplied to the upper part of the composition distribution part 40, and is discharged to the lower part of the composition distribution part 40 while dropping by gravity, so that the composition can be discharged onto the conveyor belt 50.

FIGS. 2 and 3 are diagrams schematically showing a composition distribution part of a polymerization reactor according to one embodiment of the present disclosure.

Referring to FIGS. 2 and 3, the composition distribution part 40 is configured such that the pipes can be branched into multiple stages S1 and S2 in order to uniformly discharge the composition onto the conveyor belt 50.

The composition distribution part 40 includes a central pipe 41, a connecting pipe 42 connected to the central pipe 41, and a pair of branch pipes 43 and 44 branching from the connecting pipe 42.

The central pipe 41 has a tubular shape that is long in the direction of gravity, the composition mixing part 34 can be connected to the upper part of the central pipe 41 (see FIG. 1), and the connecting pipe 42 can be connected to the lower part. The diameter D1 of the central pipe 41 may be larger than the diameter D2 of the connecting pipe 42.

The central pipe 41 may be arranged in the direction of gravity, that is, in a direction perpendicular to the upper surface of the conveyor belt 50, and the connecting pipe 42 may be inclined obliquely with respect to the upper surface of the conveyor belt 50 to be connected at a first angle 61. The first angle may be 30 to 60 degrees.

The connection pipe 42 may be configured such that a diameter D2 of a portion connected to the central pipe 41 is larger than a diameter D3 of a portion connected to the branch pipes 43 and 44.

The connecting pipe 42 rectifies the composition solution and prevents the rotational motion or behavior formed in the solution from being connected to the branch pipes. Therefore, a flow rate difference or specific gravity difference does not occur due such unnecessary movement of the solution, so that the composition solution can be uniformly supplied to the branch pipes.

The branch pipes 43 and 44 can be branched so as to be symmetrical with respect to the center line C of the connection pipe 42. Each time the pipe is branched, two branch pipes 43 and 44 are generated. In the following, the connecting pipe 42 and the group of branch pipes 43 and 44 formed each time it is separated once from the connection pipe 42 are referred to as stages S1 and S2.

The composition supply pipe according to one embodiment of the present disclosure may be branched into multiple stages S1 and S2, and the number of branches may be selected according to the width WD of the conveyor belt 50 and the discharge amount. The overall width W2 of the final stage S2 formed by being finally branched may be smaller than the width WD of the conveyor belt 50.

The composition distribution part 40 according to the present disclosure is for uniformly supplying the composition solution onto the conveyor belt 50, and the two branch pipes 43 and 44 may be symmetrical with respect to the center line C of the connecting pipe 42. The center line C of the connecting pipe 42 is a virtual line passing through the center of the connecting pipe 42.

In this way, when two branch pipes are formed, the composition solution moves to multiple stages without causing a flow rate difference, so that the composition solution can be uniformly discharged.

By the supply pressure generated when the composition solution is supplied, the composition solution is not supplied disproportionately to either side, and the two branch pipes located on both sides can supply the composition solution at a uniform pressure.

The connection pipe 42 is configured such that the diameter of an injection port A1 through which the composition solution is injected is larger than the diameter of a discharge port A2 through which the solution is discharged. At this time, the branch pipes 43 and 44 may have the same diameters as the injection port and the discharge port.

Further, in one embodiment of the present disclosure, as the pipe is branched into multiple stages, the diameter of the connecting pipe 42 to be connected later may be gradually reduced. The diameter of the injection port of the first connecting pipe included in the first end that is connected directly to the central pipe may be larger than the diameter of the injection port of the second connecting pipe included in the next stage, which is likewise reduced when the subsequent stage is connected.

Therefore, the diameter of the connecting pipe and the diameter of the branch pipe included in the front stage positioned relatively adjacent to the central pipe are larger than the diameter of the connecting pipe and the diameter of the branch pipe included in the rear stage positioned relatively far from the central pipe.

The discharge port diameter of the branch pipes 43 and 44 of the last stage may be about 0.5 to 5 inches, but is not limited thereto. It may be appropriately selected according to the size of the conveyor belt 50 or the amount of the composition solution to be supplied.

Meanwhile, the branch pipes 43 and 44 may be connected so as to be inclined at a second angle θ2 with respect to the center line C of the connection pipe 42. The branch pipes 43 and 44 are connected obliquely with respect to the center line C of the connecting pipe 42, whereby the interval W between the adjacent branch pipes 43 and 44 is made constant, and a constant amount of the composition solution may be supplied at regular intervals to the conveyor belt 50.

Therefore, the second angle θ2 can be selected in consideration of the amount and deposition region of the composition solution supplied to the conveyor belt 50. At this time, the second angle θ2 can be separated by an angle of 30 to 45 degrees, and when the connecting pipe 42 is coupled at an angle exceeding 45 degrees, the path through which the solution flows may be sharply bent and the flow of the composition solution may not be smooth, and the interval W between the two adjacent branch pipes may be widened.

As described above, in the present disclosure, the branch pipes 43 and 44, which are branched so as to be symmetric on both sides with respect to the central pipe 41, are formed in multiple stages, thereby allowing a composition solution to not be supplied disproportionately to either side, while supplying the composition solution via the plurality of branch pipes 43 and 44.

Therefore, a uniform amount of the composition solution can be supplied at regular intervals along the width of the conveyor belt 50, and polymerization energy can be uniformly supplied through the energy supply part 60, which will be described later, to obtain a polymerization gel in which the crosslinking polymerization reaction has occurred evenly. That is, the composition solution supplied to the conveyor belt may be uniformly distributed to the conveyor belt 50 without mixing a composition solution before the reaction and a polymerized gel subjected to the polymerization reaction with each other.

In the above embodiment, the configuration having two stages S1 and S2 has been described, but it is not limited thereto, and it may be further branched according to the width of the conveyor belt and the amount of supply of the composition solution, and can include multiple stages of three or more.

Referring to FIG. 1 again, the conveyor belt 50 is a place where the composition solution is discharged through the composition distribution part 40, and a polymerization reaction occurs while the composition solution is moved onto the conveyor belt 50.

The monomer composition solution 55 supplied onto the conveyor belt 50 moves from one end of the conveyor belt 50 to the other according to the movement of the conveyor belt 50. As described above, the composition solution 55 undergoes a crosslinking polymerization reaction by polymerization energy supplied from the energy supply part 60 during the movement.

The energy supply part 60 is for supplying light energy or thermal energy required for monomer polymerization, and may be located above the conveyor belt 50.

The energy supply part 60 is not limited in the configuration as long as it can transfer polymerization energy to the composition solution 55 for producing the super absorbent polymer. However, it may be at least one selected from the group consisting of an ultraviolet irradiation part, a hot air supply part, a microwave irradiation part, and an infrared irradiation part.

Further, in some cases, multiple energy supply parts 60 can be installed along the longitudinal direction of the conveyor belt 50. In addition, the installation position of the energy supply part 60 may preferably be one side of the conveyor belt 50 to which the composition solution 55 is supplied and polymerization is initiated.

The polymerized sheet-like polymerized gel is discharged to the outside of the polymerization reactor through a polymerization gel discharge part (not shown), and coarse pulverization may be performed in the additionally connected polymerized gel pulverization part.

Meanwhile, the polymerized gel pulverization part is not limited in the configuration as long as it has a shape including a pulverization device capable of coarsely pulverizing the sheet-like polymerized gel.

Specifically, any one selected from the crusher group consisting of a vertical pulverizer, a turbo cutter, a turbo grinder, a rotary cutter mill, a cutter mill, a disc mill, a shred crusher, a crusher, a chopper, and a disc cutter can be exemplified, but they are not limited to the above-mentioned examples.

At this time, in the coarse pulverization step, the polymerized gel can be pulverized so as to have a particle size of about 2 to about 10 mm.

The coarsely pulverized polymerized gel can be dried so that the water content of the polymer is about 1 to about 5%, and then pulverized so as to have a particle size of about 150 to about 850 μm.

Specific examples of the pulverizing device used for pulverizing the dried polymer include a pin mill, a hammer mill, a screw mill, a roll mill, a disc mill, a jog mill, and the like, but the present disclosure is not limited to the above-described examples.

Further, the polymer obtained after pulverization can undergo a separate process of classifying the polymer according to particle size. Preferably, the polymer having a particle diameter of about 150 to about 850 μM can be classified.

A method of producing the super absorbent polymer using the polymerization reactor for the production of the super absorbent polymer according to one embodiment of the present disclosure described above will now be described.

The method for producing the super absorbent polymer of the present disclosure includes a step of preparing a composition solution containing a water-soluble ethylenically unsaturated monomer, a polymerization initiator, and a solvent, a step of supplying the composition solution onto a conveyor belt through the branch pipes 40 branched in multiple stages as shown in FIGS. 2 and 3, and a step of subjecting the composition solution to thermal polymerization or photo-polymerization while moving the conveyor belt of the polymerization reactor and the composition solution.

The raw materials of the super absorbent polymer may include a monomer, a basic compound for neutralizing the monomer, a polymerization initiator, a crosslinking agent, and various additives.

The monomer can be used without limitation in the constitution, as long as it is a monomer commonly used in the production of the super absorbent polymer. As the monomer, any one or more selected from the group consisting of an anionic monomer and salts thereof, a nonionic hydrophilic group-containing comonomer, and an amino group-containing unsaturated monomer and a quaternary compound thereof can be used.

Specifically, any one or more selected from the group consisting of: an anionic monomer such as (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic group-containing monomer such as (meth)acrylamide, N-substituted (meth) acrylate, 2-hydroxyethyl(meth)acrylate, 2-hydroxypropyl (meth)acrylate, methoxypolyethylene glycol (meth)acrylate, or polyethylene glycol (meth)acrylate; and an amino group-containing unsaturated monomer such as (N,N)-dimethylaminoethyl(meth)acrylate or (N,N)-dimethylaminopropyl (meth)acrylamide, and a quaternary compound thereof can be preferably used.

The concentration of the monomer can be appropriately selected and used in consideration of the polymerization time, reaction conditions, and the like.

The basic compound can be used without limitation in the constitution as long as it is a compound that is dissolved in water to exhibit basicity. Such basic compounds can be selected, for example, from alkali metal hydroxides such as potassium hydroxide and sodium hydroxide; hydrides such as lithium hydride and sodium hydride; amide compounds such as lithium amide, sodium amide, and potassium amide; alkoxide compounds such as sodium methoxide and potassium methoxide; and combinations thereof.

The basic compound may be contained in an amount of 7 to 20% by weight based on the total content of the monomer composition solution.

The monomer composition solution contains a polymerization initiator, and when ultraviolet rays are irradiated from the polymerization energy supply part, it may include a photo-polymerization initiator, and when hot air is supplied, it may include a thermal polymerization initiator and the like.

As the thermal polymerization initiator, any one or more selected from the group consisting of a persulfate-based initiator, an azo-based initiator, hydrogen peroxide, and ascorbic acid can be used. Specific examples of the persulfate-based initiator may include sodium persulfate ($Na_2S_2O_8$), potassium persulfate ($K_2S_2O_8$), ammonium persulfate $(NH_4)_2S_2O_8$, and the like, and examples of the azo-based initiator include 2,2-azobis(2-amidinopropane) dihydrochloride), 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid), and the like. More various thermal polymerization initiators are well disclosed in "Principles of Polymerization (Wiley, 1981 sus)" written by Odian, p. 203, however, they are not limited to the above-mentioned examples.

As the photo-polymerization initiator, any one or more compounds selected from the group consisting of benzoin ether, dialkyl acetophenone, hydroxyl alkylketone, phenyl glyoxylate, benzyl dimethyl ketal, acyl phosphine, and α-aminoketone may be used. Meanwhile, specific examples of acyl phosphine may include commercially available Lucirin TPO, namely, 2,4,6-trimethyl-benzoyl-trimethyl phosphine oxide. More various photo-polymerization initiators are well disclosed in "UV Coatings: Basics, Recent Developments and New Applications, (Elsevier, 2007)" written by Reinhold Schwalm, p. 115, however, they are not limited to the above-mentioned examples.

As the crosslinking agent, one kind or a combination of two or more kinds selected from a diacrylate-based crosslinking agent including hexanediol diacrylate, ethylene glycol diacrylate, diethylene glycol diacrylate, triethylene glycol diacrylate, propylene glycol diacrylate, dipropylene glycol diacrylate, and tripropylene diacrylate; a triacrylatebased crosslinking agent; an aziridine-based crosslinking agent; an epoxy-based crosslinking agent; and the like can be used.

The crosslinking agent may be contained in an amount of about 0.01 to about 0.5% by weight based on the total content of the monomer composition.

Additives may include a thickener, a plasticizer, a preservation stabilizer, an antioxidant, and the like.

The monomers, basic compound, polymerization initiator, crosslinking agent, and additive can be prepared in the form of a solution dissolved in a solvent.

In this case, the usable solvent can be used without limitation in the constitution as long as it can dissolve the above-mentioned components. For example, one kind or a combination of two or more kinds selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, and the like can be used.

The solvent may be included in the residual quantity excluding the above-mentioned components based on the total content of the monomer composition.

The composition solution is supplied from the composition supply part 34 of the polymerization reactor, and is deposited onto the conveyor belt 50 through branch pipes 43 and 44 branched in multiple stages.

In this case, the composition solution may be supplied in a predetermined amount at regular intervals along the width of the conveyor belt.

In the production method of the super absorbent polymer according to the present disclosure, the composition solution is supplied onto the conveyor belt using the branch pipes branched in multiple stages as described above, so that a uniform amount of the composition solution can be supplied to the conveyor belt without being biased to either side depending on the position. Therefore, it is possible to obtain a polymerized gel in which the polymerization energy is uniformly supplied over the entire volume of the composition solution and the cross-linking polymerization reaction is uniformly performed with respect to the composition solution.

The polymerization reaction may proceed by receiving the supply of light such as ultraviolet light from the light irradiation part.

After progressing polymerization of the composition solution, the super absorbent polymer can be produced through a process such as pulverizing and drying the polymerization result, and processes such as pulverization and drying may be performed according to a conventional method for producing a super absorbent polymer.

For example, a polymer sheet in the pulverizing step can be pulverized into a size of usually several to several hundred millimeters.

Although the present disclosure has been described with reference to the embodiments shown in the accompanying drawings, it is to be understood that the present disclosure is not limited thereto, but on the contrary, various modifications or other embodiments can be made within the scope equivalent to the present disclosure by those skilled in the art. Therefore, the true scope of protection of the present disclosure should be defined by the following claims.

The invention claimed is:

1. A polymerization reactor for production of a super absorbent polymer, the reactor comprising:

a composition supply part configured to supply a monomer composition solution;

a central pipe connected to the composition supply part and has a tubular shape that is long in a direction of gravity;

a composition distribution part including a first connecting pipe that is obliquely connected to the central pipe at a first angle with respect to the central pipe, and a pair of first branch pipes that are obliquely branched at a second angle with respect to the first connecting pipe and the first branch pipes are symmetrical with each other with respect to an axial center line of the first connecting pipe;

a conveyor belt located under a discharge port of the first branch pipe and on which the composition solution is deposited; and an energy supply part configured to supply polymerization energy to the composition solution on the conveyor belt, wherein the first angle is an angle between the conveyor belt and the axial center line of the first connecting pipe, which is 30 to 60 degrees, the second angle is an angle between the connecting pipe and each branch pipe, which is 30 to 45 degrees, wherein the composition distribution part further comprises a pair of second connecting pipes each connected to each of the pair of the first branch pipes, and a pair of second branch pipes branched from each of the pair of the second connecting pipes, and wherein each second connecting pipe of the pair of second connecting pipes has an axial center line and the axial center lines of the second connecting pipes and the axial center line of the first connecting pipe are symmetrically arranged with respect to an axial center line of the central pipe.

2. The polymerization reactor according to claim 1, wherein the pair of first branch pipes are inclined with respect to the conveyor belt at the first angle.

3. The polymerization reactor according to claim 1, wherein a diameter of a first connection pipe injection port relatively adjacent to the central pipe is larger than a diameter of a first connection pipe discharge port relatively adjacent to the first branch pipe.

4. The polymerization reactor according to claim 1, wherein the composition supply part further comprises a raw material supply part, a solvent supply part, and a monomer composition mixing part.

5. The polymerization reactor according to claim 1, wherein the energy supply part is configured to supply light energy.

6. A polymerization reactor for production of a super absorbent polymer, the reactor comprising:

a composition supply part configured to supply a monomer composition solution;

a central pipe connected to the composition supply part and has a tubular shape that is long in a direction of gravity;

a composition distribution part connected to the central pipe and comprising a pipe connected in a plurality of stages;

a conveyor belt configured to receive the composition solution deposited from the composition distribution part; and an energy supply part configured to supply energy for polymerization to the composition solution on the conveyor belt, wherein each of the stages comprises a connecting pipe and a pair of branch pipes branched to both sides based on the connecting pipe, wherein an axial center line of each connecting pipe of each stage forms a first angle with respect to the conveyor belt, and the pair first branch pipes angle are obliquely branched at a second angle between the connecting pipe and each first branch pipe, wherein the first angle is within a range of 30 to 60 degrees and the second angle is within a range of 30 to 45 degrees, and wherein a first stage of the composition distribution part comprises a first connecting pipe connected to the central pipe, and a pair of first branch pipes branched from the first connection pipe, and a subsequent stage connected to the first stage comprises a pair of second connecting pipes each connected to each of the pair of the first branch pipes of the first stage, and a pair of second branch pipes branched from each of the pair of the second connecting pipes, wherein the axial center lines of the connecting pipes of the plurality of stages are symmetrically arranged with respect to an axial center line of the central pipe.

7. The polymerization reactor according to claim 6, wherein in the connecting pipe, a diameter of an injection port through which the composition solution is injected is larger than a diameter of a discharge port through which the composition solution is discharged.

8. The polymerization reactor according to claim 6, wherein the diameter of the first connecting pipe is larger than the diameter of the second connecting pipe, and the diameter of the pair of first branch pipes is larger than the diameter of the pair of second branch pipes.

9. The polymerization reactor according to claim 6, wherein the branch pipes of each stage are arranged symmetrically with respect to the axial center line of the central pipe.

10. The polymerization reactor according to claim 1, wherein the axial center line of the first connecting pipe and the axial center lines of the second connecting pipes are parallel.

11. The polymerization reactor according to claim 6, wherein the axial center lines of the connecting pipes of the plurality of stages are parallel.

* * * * *